United States Patent Office 3,277,121
Patented Oct. 4, 1966

3,277,121
CONVERSION OF $\Delta^{11}$-STEROIDS TO 11-OXYGENATED STEROIDS
Kekhusroo R. Bharucha and Heinrich M. Schrenk, Toronto, Ontario, Canada, assignors to Canada Packers Limited, Toronto, Ontario, Canada
No Drawing. Filed May 4, 1964, Ser. No. 364,785
23 Claims. (Cl. 260—397.1)

This invention relates to a process for the preparation of 12α-iodo-11-oxygenated steroids and 11-oxygenated steroids devoid of a C–12 substituent from corresponding $\Delta^{11}$-steroid compounds. More particularly, the invention relates to a process for the preparation of 11β-hydroxy- and 11-keto-steroids in good yield from the corresponding $\Delta^{11}$-steroid compounds through the use of hypoiodous acid to provide an 11β-hydroxy-12α-iodo derivative from which iodine can be readily removed.

The invention is useful for the preparation of steroid intermediates including the known 11-oxygenated steroid intermediates which have been used for the synthesis of cortisone, hydrocortisone, other corticoidal hormones, and analogs.

Reichstein in U.S. Patent 2,403,683 has disclosed that the addition of hypobromous acid, generated from N-bromacetamide (NBA), to the $\Delta^{11}$-double bond of certain $\Delta^{11}$-unsaturated steroid compounds proceeds to give the 11β-hydroxy-12α-bromo derivatives. The yield, however, is very poor. Fieser and Fieser (Steroids, 1959, pages 636–7) have shown that the application of this reaction to methyl $\Delta^{11}$-3-keto-etiocholenate provides the 11β-hydroxy-12α-bromo derivative in only 24% yield and in addition produces the 11,12 dibromide and 9-bromo-$\Delta^{11}$-ester. We have carried out Reichstein's process on methyl 3α-acetoxy-$\Delta^{11}$-cholenate with NBS (N-bromosuccinimide) and with NBA using catalytic amounts of perchloric acid, with maximum yields obtainable being in the order of 30% (after oxidation and zinc treatment to remove bromine). The bromohydrin is difficult to isolate in pure state by crystallization and the same is true for the corresponding ketone, perhaps because the reaction gives a complex mixture. Many attempts have been made to improve the bromohydrin reaction but to our knowledge none have proved to be completely successful. This has been one of the reasons while the bile acid route to 11-oxygenated steroids via the $\Delta^{11}$-compounds has not proved as attractive as other routes.

We have now unexpectedly found that, in marked contrast to hypobromous acid, hypoiodous acid (HOI) adds on very readily to $\Delta^{11}$-unsaturated steroid compounds to give the 11β-hydroxy-12α-iodo derivatives in excellent yields. Yields of 90% and better have been obtained. Moreover, the iodine atom at C–12 can be removed quite readily and in nearly quantitative yield by hydrogenolysis, e.g., with a Raney nickel catalyst, to give the corresponding 11β-hydroxy steroid. The 11β-hydroxy-12α-iodo steroid can be oxidized with chromic acid to give the 11-keto-12α-iodo compound and the iodine removed from the latter by treatment with Zn dust in acetic acid to provide the 11-keto compound, again in excellent yields. Overall yields (based on the $\Delta^{11}$-steroid starting material) of better than 50% (up to about 90%) of the corresponding 11β-hydroxy and 11-keto compounds, after hydrogenolysis to replace the iodine atom with hydrogen, are readily obtained.

It is an object of the invention, therefore, to provide an improved process for the preparation of steroid derivatives from $\Delta^{11}$-steroidal starting materials.

Another object of the invention is to provide an improvement in the process of converting $\Delta^{11}$-steroid compounds to 11-oxygenated derivatives.

Another object of the invention is to provide a method for increasing the yield of 11-oxygenated steroids from $\Delta^{11}$-steroid compounds of the bile acid series, thereby rendering this route to therapeutically useful end products more attractive commercially.

Another object of the invention is to provide a method for producing substantially pure methyl 3α-acetoxy-11β-hydroxy-cholanate in good yield from methyl 3α-acetoxy-$\Delta^{11}$-cholenate.

The process in its broad aspects can be applied to any of the known steriod derivatives having a $\Delta^{11}$-double bond. It may, for example, be employed with $\Delta^{11}$-derivatives of ergostane, coprostane, sitostane, stigmastane, spirostane, allospirostane, cholane, allocholane, pregnane, allopregnane, androstane and testane, which additionally may be substituted in the nucleus or in the side chain. The process is especially advantageous in improving the economies of the bile acid and hecogenin routes to therapeutically useful steroids. Thus, it may be conveniently employed with $\Delta^{11}$-derivatives of desoxycholic acid, which we have found can be produced in good yields by conversion of desoxycholic acid into the 3-mono ester of methyl desoxycholate followed by sulfonation-dehydrosulfonylation to introduce $\Delta^{11}$-unsaturation. This procedure is described in detail in copending application S.N. 309,404, filed September 17, 1963, now Pat. No. 3,164,616.

The reaction between the $\Delta^{11}$-steroid and hypoiodous acid (HOI) is conveniently carried out in the presence of a suitable aqeuous organic solvent, such as an alcohol or an ether. The preferred solvents for the reaction are dioxane and tertiary butanol. The HOI may be generated from N-iodosuccinimide (NIS) or other N-iodoamides which will decompose in the presence of water to form HOI.

The reaction is preferably carried out in the presence of a strong acid such as perchloric ($HClO_4$) whereby the tendency for formation of undesired by-products is suppressed. This expedient has also been used in preparation of bromohydrins but the yields obtained in preparation of the iodohydrins are none the less startingly improved in contrast to the bromohydrin process.

The reaction to the iodohydrin takes place rapidly and with ease at room temperature, but higher or lower temperatures may be used if desired. Recovery of the iodohydrin in e.g., 90% yields is accomplished by precipitation with water. Recovery of the crude iodohydrin is improved by evaporating part of the solvent of the reaction mixture prior to precipitation in water. Purification of the crude iodohydrin is accomplished by dissolution of the recovered precipitate in a suitable solvent, such as aqueous dioxane or methanol, followed by crystallization from the solvent.

We have also found that the reaction to the iodohydrin proceeds quite readily when the HOI is generated without resort to an N-iodoamide as by in situ generation from mercuric oxide and elemental iodine. Further economies in the process are realized by this expedient which eliminates an expensive reagent.

The water precipitated reaction product in this instance, constitutes iodohydrin containing mercuric salts (HgO, $HgI_2$) which are preferably removed prior to crystallizing the iodohydrin from organic solvents. Aqueous KI solution has been found very useful for this purpose since it dissolves both HgO and $HgI_2$ extremely readily. Separation of the iodohydrin and mercuric salts might also be accomplished by use of ion exchange resin technique.

As aforestated, the iodohydrin can be subjected to deiodination by hydrogenolysis in the presence of a catalyst to provide the 11β-hydroxy-derivative unsubstituted at C–12, or may first be converted to the 11-keto-12-iododerivative by CrO₃ oxidation followed by treatment with zinc in acetic acid to remove the iodine atom. The hydrogenolysis reaction, if properly conducted, proceeds almost quantitatively.

While this reaction may be conducted by hydrogen treatment in the presence of other metal hydrogenation catalysts, e.g., palladium on charcoal, Raney nickel is preferred. Care should be taken to ensure the catalyst is not alkaline as alkalinity may result in formation of undesired epoxides. Pretreatment of the catalyst with an acid, e.g., acetic, followed by washing with distilled water to substantial neutrality is a wise precaution.

Deiodination by hydrogenation in the presence of Raney nickel proceeds to completion at room temperature in a solvent mixture of benzene and methanol, provided a substantial excess of the catalyst is employed. In a mixture of three parts benzene and four parts methanol deiodination was complete with 10 parts by weight of catalyst to 1 part by weight of the steroid. The amount of catalyst may be reduced by including in the deiodination reaction a compound which will react with the hydroiodic acid formed during the hydrogenation and remove it from the sphere of the reaction. An alkali metal salt of a lower alkanoic acid, such as sodium acetate, is useful for this purpose. By use of this expedient the hydrogenation reaction will proceed with very much less catalyst. As little as 1:1 proportions of catalyst to iodo-compound by weight have been found satisfactory and even smaller proportions could undoubtedly be used.

It has also been found advantageous, from the standpoint of high yields in less time and with less catalyst to conduct this reaction under pressure. Pressures of e.g. 2–7 atmospheres are satisfactory. Methyl 3α-acetoxy-11β-hydroxy-cholanate has been produced in quantitative yield by hydrogenation of the iodohydrin for about 6 hours at 50 p.s.i.

The process is illustrated by the following diagrams:

to give the 11β-hydroxy-12α-iodo compound (II) in about 90% yield. The iodohydrin (II) can be hydrogenolyzed in the presence of Raney nickel as the catalyst to give methyl 3α-acetoxy-11β-hydroxy-cholanate (III) in substantially quantitative yield. The compound (II) may be readily crystallized in substantially pure form, as from methanol or aqueous dioxane with 85–90% recovery. The iodine atom at C–12 can also be removed by oxidation of the compound (II) with chromic acid to give the corresponding iodo-ketone (IV) which on treatment with Zn-AcOH is converted into methyl 3α-acetoxy-11-keto-cholanate (V), both of these steps proceeding in excellent yields (>95%).

The invention is further illustrated by the following examples of practice. Wherever possible, operations were carried out in an inert atmosphere of dry nitrogen. Thin-layer chromatograms (TLC) were carried out on silica gel using a mixture (3:1) of cyclohexane-ethyl acetate. The spots were made visible by spraying the chromatogram with a 10% solution of phosphomolybdic acid in ethanol, and warming. Ultra violet absorption measurements were carried out in ethanol. All temperatures are in degrees centigrade.

EXAMPLE 1

*Comparison of bromohydrin and iodohydrin reactions*

(a) To a magnetically stirred solution of 0.215 g. of methyl 3α-acetoxy-Δ¹¹-cholenate in 8 ml. of purified dioxane and 3 ml. of water, two drops 70–72% HClO₄ were added followed by 0.083 g. NBA (N-bromacetamide). The latter dissolved within one minute. After 18 minutes stirring a pale yellow color developed, which was discharged 3 minutes later by the addition of freshly prepared 5% aqueous Na₂SO₃ solution (17–18 drops). Isolation of the product by precipitation into water gave 0.224 g. of a colorless solid, M.P. 152–173° C. (143° C.

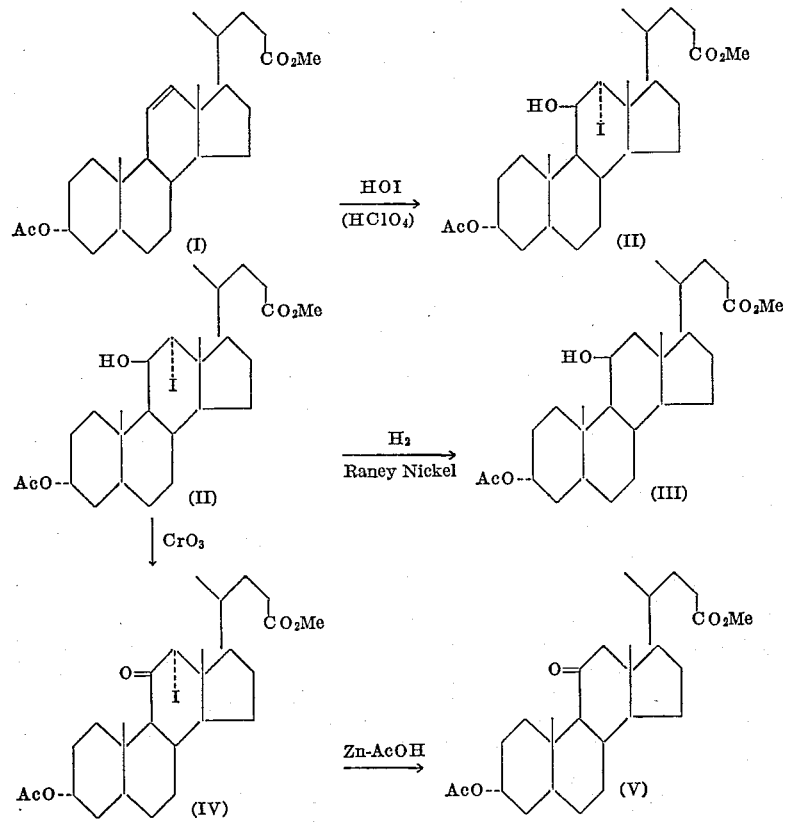

In the foregoing series of reactions hypoiodous acid (HOI) reacts with methyl 3α-acetoxy-Δ¹¹-cholenate (I)

sinters, 125° C. shrinks). Analysis by TLC showed three nearly equal spots.

A 0.216 g. portion of the above crude bromohydrin was oxidized using 55 mg. CrO₃, 5.5 ml. AcOH and 0.15 ml. water to give 11-keto-12-bromo compound as a pale yellow solid (0.181 g.), M.P. 138–157° C. (135° sinters; 120° shrinks), $E^{1\%}_{1cm.}$ 238 mμ = 44.9 in ethanol.

From the intensity of the 1680 cm.⁻¹ band in the I.R. spectrum, the amount of Δ⁹,¹¹-12-keto compound was estimated to be about 11%. TLC showed 3 spots.

A 154 mg. portion of the crude bromoketone was debrominated by heating on a steam-bath in 1.5 ml. glacial acetic acid with 154 mg. Zn dust for 15 minutes. Additional Zn dust (76 mg.) was then added and the heating continued for further 15 minutes. After filtration and pouring into water, the product was isolated by extraction with ether to give a yellow semi-solid (122 mg.), $E^{1\%}_{1cm.}$ 240 mμ = 42.8 in ethanol.

From the I.R. spectrum (1680 cm.⁻¹ band), the Δ⁹,¹¹-12-ketone content appears to be about 7%. Crystallization of 99 mg. from hexane-ether (9:1) gave 50 mg., M.P. 132–134° C. (129° sinters). Beilstein test—negative (Ott and Reichstein, Helv. Chim. Acta., 1943, 26, 1810, give M.P. 131–133° for methyl 3α-acetoxy-11-keto-cholanate). The overall yield based on Δ¹¹ compound is about 33%. Recrystallization of 42 mg. from hexane-ether (about 3:2) gave 28 mg. M.P. 133–135° C. (132° sinters). The use of 0.107 g. of NBS (N-bromosuccinimide) in place of NBA (N-bromacetamide) in step 1 of the foregoing procedure provided substantially the same result.

(b) 0.215 g. of methyl 3α-acetoxy-Δ¹¹-cholenate was treated with 0.135 g. of NIS (N-iodosuccinimide) in 8 ml. dioxane and 3 ml. of water in the presence of 2 drops of 70–72% HClO₄ for about 20 minutes to give crude iodohydrin as a pale yellow solid (0.260 g.), M.P. 122° C. decomp. (121° sinters; 120° shrinks), $E^{1\%}_{1cm.}$ 260 mμ = 10.5 in ethanol.

TLC showed 3 spots with the middle one about 90%, i.e., the crude product was about 90% iodohydrin.

0.241 g. of the crude iodohydrin was oxidized in 5.7 ml. glacial acetic acid with 56 mg. CrO₃ in 0.19 ml. water and 0.5 ml. acetic acid at room temperature for 2 hours as described above to give the crude iodoketone as a colorless solid (0.236 g.), M.P. 156–172° C. decomp. (125° shrinks). In ethanol, the U.V. spectrum showed inflexions at 245 and 275 mμ and a peak at 327 mμ ($E^{1\%}_{1cm.}$ = 7)

For deiodination, a 0.225 g. portion of the above solid in 2.3 ml. glacial acetic acid was heated on the steam-bath with stirring, while 0.225 g. Zn dust was added in small lots over 5 minutes. After 15 minutes, a further amount (0.113 g.) of Zn dust was added and the heating continued for an additional 15 minutes. The mixture was then filtered and the Zn residues washed well with hot acetic acid. The combined filtrate and washings were poured into about 125 ml. cold tap-water, the mixture refrigerated for 17 hrs., filtered, washed first with dil. NaHCO₃ solution, then with water and finally dried at 53°/10 mm. for 21 hrs. Wt. of colorless solid: 0.163 g. (93%), M.P. 128–131° C. (127° sinters; 119° shrinks). Beilstein test—negative, $E^{1\%}_{1cm.}$ 238 mμ = 12.2 in ethanol.

TLC showed 3 spots with the middle one being about 90%. Crystallization (0.139 g.) from about 1.5 ml. hexane gave 0.126 g. M.P. 131–133° C. (129° sinters).

EXAMPLE 2

*Pure crystalline methyl 3α-acetoxy-11β-hydroxy-12α-iodo-cholanate using NIS in aqueous dioxane*

To a solution of 0.215 g. of methyl 3α-acetoxy-Δ¹¹-cholenate in 8 ml. of purified dioxane and 3 ml. of water, two drops of 70–72% HClO₄ were added followed by the addition of 0.135 g. of N-iodosuccinimide. Crystallization set in after 13 minutes and after 20 minutes (from the time of the addition of NIS) the yellow color was discharged by addition of freshly prepared aqueous 5% Na₂SO₃ solution (20 drops). Isolation of the product was accomplished by precipitation into water, and 0.264 g. (92% of theoretical) of a colorless solid were obtained. This solid had a melting point 132° C. (decomp.) and analysis by thin layer chromatography (TLC) showed three spots with the middle one being about 90%. Crystallization of 0.237 g. of this material from 2 ml. of dioxane and 0.6 ml. of water gave 0.201 g. (85%) of a product having a melting point of 133° C. (decomp.). Recrystallization of 0.196 g. of this material from 1.65 ml. of dioxane and 0.5 ml. of water gave 0.184 g. (94%) of colorless needles analyzing essentially pure methyl 3α-acetoxy-11β-hydroxy-12α-iodocholanate, M.P. 131° C. decomp. (129° C. sinters), (the M.P. varies with the rate of heating), $[a]_D^{26}$ +62.33° (C.=1.018 in purified dioxane), $E^{1\%}_{1cm.}$ 261 mμ = 11.8.

*Analysis.*—Found: C, 56.34; H, 7.60; O, 13.71; and I, 22.16%. C₂₇H₄₃O₅I requires C, 56.44; H, 7.49; O, 13.93; and I, 22.12%.

EXAMPLE 3

*Methyl 3α-acetoxy-11-keto-cholanate using NIS in aqueous dioxane, CrO₃ oxidation and Zn-AcOH deiodination*

0.43 g. of methyl 3α-acetoxy-Δ¹¹-cholenate was reacted with 0.270 g. N-iodosuccinimide in 16 ml. of dioxane and 6 ml. of water in the presence of 4 drops of 70–72% HClO₄ for 25 minutes at room temperature. Crystallization set in after about 17 minutes. After addition of 5% aqueous Na₂SO₃ solution (35 to 40 drops), the product was isolated by precipitation into water. The product was a colorless solid 0.545 g. (95%), M.P. 130° C. (decomp.). This product was estimated to be about 90% methyl 3α-acetoxy-11β-hydroxy-12α-iodo-cholanate by TLC.

0.526 g. of the preceding crude iodohydrin was oxidized in glacial acetic acid (10 ml.) with a solution of 0.122 g. of CrO₃ in 0.5 ml. of acetic acid and 0.3 ml. of water at room temperature for 2 hours, 10 minutes. 0.1 ml. of methanol was added and 15 minutes later the product was isolated by precipitation into water. Weight of colorless solid: 0.516 g., M.P. 169–174° C. (decomp.). This product was estimated to be about 90% methyl 3α-acetoxy-11-keto-12α-iodo-cholanate by TLC. Crystallization of a 0.250 g. portion of this crude iodo-ketone from 1.5 ml. of dioxane and 0.5 ml. of water gave 0.192 g. of colorless crystals, M.P. 181–182° C. TLC showed only one spot. Recrystallization of 0.189 g. of this product gave 0.144 g. of crystals having a melting point of 183° C. TLC again showed only one spot. For analysis, a sample of pure methyl 3α-acetoxy-11-keto-12α-iodo-cholanate was obtained by recrystallization from the same mixture of solvents and showed M.P. 182–183° C.

$[\alpha]_D^{25}$ −10.55°

(C.=1.0; purified dioxane)

$E^{1\%}_{1cm.}$ 271 and 327 mμ = 8.4 and 6.7 respectively.

*Analysis.*—Found: C, 56.44; H, 7.23; O, 13.74; and I, 22.25%. C₂₇H₄₁O₅I requires C, 56.64; H, 7.22; O, 13.97; and I, 22.17%.

A 0.246 g. portion of the crude iodo-ketone (prior to crystallization) from above was deiodinated in 2.5 ml. of glacial acetic acid by heating on a steam bath for 15 minutes with 0.245 g. of zinc dust. Additional zinc dust (0.123 g.) was then added and the heating was continued for a further 20 minutes. After removal of the zinc residues by filtration, the product was isolated by precipitation into water. 0.186 g. (97%) of a colorless solid were obtained. This product had a melting point of 130–132° C. and was found to be over 90% of methyl 3α-acetoxy-11-keto-cholanate by TLC. This crude 11-ketone was dissolved in hexane-benzene and purified by chromatography over neutral alumina to give pure methyl 3α-acetoxy-11-keto-cholanate having a melting point 134.5–136° C.

In all the previous examples, the isolation of the crude iodohydrin was carried out by pouring the total reaction mixture into water. This resulted in large volumes with consequent slight loss of material (5–10%). In addition, the product was obtained in a very fine state of division with the result that the filtration process was quite slow. The isolation procedure is improved by first distilling off the bulk of the organic solvent in vacuo before pouring into water. (The vacuum distillation proceeds in a satisfactory manner at 35–40° C. and 10 mm. Hg.) This gives the crude iodohydrin in near quantitative yields and greatly facilitates the filtration process.

EXAMPLE 4

*Methyl 3α-acetoxy-11-keto-12α-iodo-cholanate using NIS in aqueous dioxane and modified isolation procedure followed by $CrO_3$ oxidation*

To a slightly turbid solution of 1 g. of methyl 3α-acetoxy-$\Delta^{11}$-cholenate in 40 ml. of purified dioxane and 15 ml. water, 70–72% $HClO_4$ (10 drops) and 0.675 g. NIS were added, and the mixture was stirred magnetically in a stoppered flask ($N_2$ atmosphere) at room temperature for 25 minutes, crystallization having commenced 15 minutes after addition of NIS. Freshly prepared 5% w./v. aqueous $Na_2SO_3$ solution (2.1 ml.) was then added until the yellow color was discharged. After concentration in vacuo at 35–40° C. (bath temp.) to a small volume, 100 ml. water was added, when the product separated out. After refrigeration for 20 hours, the colorless crystals were filtered off (filtered extremely readily), washed with water to pH 5.5–6 and dried at 52°/10 mm. for 23 hrs. Wt.: 1.310 g. (98%), M.P. 125–127° C. decomp.

$E_{1cm.}^{1\%}$ 260 m$\mu$ = 10.5 in ethanol

TLC showed as usual 3 spots with the middle one >90%.

A 1.144 g. portion of the crude iodohydrin was crystallized from 100 ml. distilled methanol under refrigeration for 23 hrs. to give 0.932 g. (81.4%) of colorless needles, M.P. 135° C. decomp. (133° C. shrinks and discolors). The M.P. varies with the rate of heating. TLC showed only one spot. Second crop: 0.080 g. (7%), M.P. 132–133° decomp. TLC showed essentially one spot.

To a suspension of the above crystallized methyl 3α-acetoxy-11β-hydroxy-12α-iodo-cholanate (0.54 g.) in 10 ml. glacial acetic acid, a solution of 0.126 g. of $CrO_3$ in 0.25 ml. glacial acetic acid and 0.3 ml. water was added (with cooling), another 0.25 ml. of acetic acid being used for rinsing. The mixture was magnetically stirred at room temperature for 2½ hrs., a clear solution resulting after about 1 hour's stirring. 0.1 ml. methanol was added to destroy the excess oxidizing agent and 15 minutes later the solution was poured into water. After refrigeration for 2½ hrs., the product was filtered, washed with water to pH 5 and dried at 54°/10 mm. for 16 hrs. Wt. of colorless solid: 0.533 g. (99%) M.P. 179–180° C. (178° sinters, 162° shrinks).

$E_{1cm.}^{1\%}$ 270 m$\mu$ = 8.8 and $E_{1cm.}^{1\%}$ 327 m$\mu$ = 6.6 in ethanol TLC showed a single spot. The material is essentially pure methyl 3α-acetoxy-11-keto-12α-iodo-cholanate.

EXAMPLE 5

*Methyl 3α-acetoxy-11β-hydroxy-12α-iodo-cholanate using NIS in aqueous dioxane and modified isolation procedure*

To a solution of 5.26 g. of methyl 3α-acetoxy-$\Delta^{11}$-cholenate in 210 ml. of purified dioxane and 79 ml. of water, 0.6 ml. of 70–72% $HClO_4$ where added followed by the addition of 3.311 g. of N-iodosuccinimide. The mixture was stirred magnetically in a stoppered flask at room temperature for 28 minutes. The NIS dissolved readily to form a brown solution from which crystals separated after 18 minutes. 8 ml. of freshly prepared 5% w./v. aqueous $Na_2SO_3$ solution were added when the color was discharged. The colorless mixture was concentrated in vacuo to a small volume, diluted with 480 ml. of water and cooled for 2 hours at −10° C. and then for 4 hours at 0–5° C. Filtration, washing with water and drying at 54° C./10 mm. for 16 hours gave 6.949 g. (98.95%) of a nearly colorless solid, M.P. 123° C., analyzing greater than 90% methyl 3α-acetoxy-11β-hydroxy-12α-iodo-cholanate by TLC. A 6.633 g. portion of this crude product was dissolved in 500 ml. of distilled methanol and the solution was concentrated on a steam bath until crystallization commenced. 5.393 g. (81.3%) of the product was recovered. Analysis by TLC showed only one spot.

EXAMPLE 6

*Methyl 3α-acetoxy-11β-hydroxy-12α-iodo-cholanate using NIS in aqueous t-butanol*

To a solution of 0.5 g. of methyl 3α-acetoxy-$\Delta^{11}$-cholenate in 20 ml. commercial tertiary butanol and 15 ml. water, 5 drops of 70–72% $HClO_4$ were added, followed by 0.337 g. NIS. The mixture, protected from light, was stirred at room temperature for 25 minutes, crystallization having commenced after 3½ minutes from the addition of NIS. 1 ml. of freshly prepared aqueous 5% $Na_2SO_3$ solution was added when the color was discharged. The bulk of solvent was removed in vacuo at 35–40° C. (bath temp.), the residue diluted with about 150 ml. water, kept under refrigeration for 4½ hrs. The crude iodohydrin was then filtered off, washed with water to pH~6 and dried for 16 hrs. at 45°/10 mm. overnight. Wt. of colorless solid: 0.640 g. (95.9%), M.P. 129° decomp.

$E_{1cm.}^{1\%}$ 260 m$\mu$ = 10.2 in ethanol

TLC showed 3 spots with the middle being >90%.

A 0.61 g. portion of the crude iodohydrin was dissolved in 15 ml. of boiling acetone, diluted with 10 ml. of methanol and concentrated on the steam-bath until crystallization commenced in the hot. After standing under refrigeration for 18 hrs., the crystals were filtered off, washed with cold (−12° C.) methanol and dried at 45°/10 mm. for 4 hrs. Wt. of colorless crystals: 0.525 g. (86%) M.P. 144–145° decomp. TLC showed a single spot.

EXAMPLE 7

*Methyl 3α-acetoxy-11β-hydroxy-12α-iodo-cholanate using HOI generated in situ from $HgO$-$I_2$*

To a cloudy solution of 0.215 g. of methyl 3α-acetoxy-$\Delta^{11}$-cholenate in 8 ml. of purified dioxane and 3 ml. distilled water, 0.135 g. of red HgO and 0.160 g. of powdered iodine were added, followed by 2 drops of 70–72% $HClO_4$. The mixture protected from light, was stirred at room temperature for 13 minutes, crystallization having commenced within 2 minutes. 30 drops of freshly prepared aqueous 5% $Na_2SO_3$ solution were added and the resultant yellow mixture concentrated in vacuo at 35–37° C. (bath temp.) to a small volume, the residue diluted with water and kept under refrigeration for 4 hours. The bright yellow solid was then filtered off, washed with water and the wet cake slurried with freshly prepared 5% aqueous KI solution. It was refiltered, washed with more KI solution, then with water and finally dried at 52°/10 mm. overnight (18 hrs.) to give the crude iodohydrin as a nearly colorless solid (0.263 g.; 91.6%), M.P. 131° decomp.

$E_{1cm.}^{1\%}$ 260 m$\mu$ = 9.6 in ethanol

TLC showed 3 spots with the middle one being >90%.

A 0.245 g. portion of the crude iodohydrin was crystallized from methanol at low temperature (below −10° C.) for 69 hrs., the crystals filtered off and washed with cold (−10° C.) methanol, to give colorless needles (0.199 g.; 81.2%), M.P. 137° C. decomp. TLC showed a single spot.

EXAMPLE 8

*Preparation of 11-hydroxy-12-iodo-pregnane-3:20-dione from $\Delta^{11}$-pregnene-3:20-dione using NIS in aqueous dioxane*

To a magnetically stirred solution of 1 g. of $\Delta^{11}$-pregnene-3:20-dione in 30 ml. of peroxide-free dioxane and 17 ml. of distilled water, 10 drops of 70–72% HClO$_4$ were added, followed by 0.9 g. NIS. The stirring was continued at room temperature for 25 minutes, crystallization having commenced after about 3½ minutes. 3 ml. of freshly prepared aqueous 5% Na$_2$SO$_3$ solution were added when the color was discharged. After removal of bulk of solvent in vacuo at 35–40° C. (bath temp.), the residue was diluted with water and the mixture refrigerated for 23 hrs. It was then filtered, washed with water to pH~6 and dried at 48°/10 mm. for 17 hrs. to give an almost colorless solid (1.350 g.; 92.6%), M.P. 158–195° C. decomp.

$E_{1\,cm}^{1\%}$ 259 m$\mu$=13.1 in ethanol

TLC [top layer of toluene-acetic acid-water (15:10:1) system] showed 2 spots with the top one >90%.

The iodohydrin (1 g.) was dissolved in 25 ml. of purified dioxane at almost the boiling point and to the hot solution 10 ml. of distilled water were added. Crystallization set in immediately and was completed under refrigeration in 48 hours. 0.838 g. of a beige colored solid was recovered, M.P. 159–161° C. (decomp.), $E_{1\,cm}^{1\%}$ 260 m$\mu$=13.1 in ethanol TLC showed essentially a single spot. For analysis, a 0.402 g. sample was crystallized from ethyl acetate (dissolved in 150 ml. and boiled down to about 60 ml.) under refrigeration for 16 hrs. to give pure 11$\beta$-hydroxy-12$\alpha$-iodo-pregnane-3:20-dione as a faintly yellow solid (0.332 g.), M.P. 161–162° C. (decomp.), $E_{1\,cm}^{1\%}$ 260 m$\mu$=13.65 in ethanol $[\alpha]_D^{23}$ =+46.92° C. (c.=0.5, purified dioxane). The iodohydrin is only sparingly soluble in most organic solvents.

*Analysis.*—Found: C, 54.87; H, 6.86; O, 10.19 and I, 27.49%. C$_{21}$H$_{31}$O$_3$I requires C, 55.02; H, 6.76; O, 10.47 and I, 27.68%.

I.R. bands (KBr): 3430, 1716, 1684, 1437, 1387, 1364, 1327, 1296, 1265, 1218, 1206, 1187, 1164, 1112, 1077, 1016, 1001, 967, 942, 805, 777, 760, and 687 cm.$^{-1}$.

The following examples illustrate procedure for deiodination of the 12-iodo-intermediates by hydrogenolysis in the presence of Raney nickel. The Raney nickel catalyst used in these examples was obtained from the manufacturer in the form of an aqueous suspension. This was acidified with glacial acetic acid and, after a short time, was filtered. The catalyst on the filter was washed with distilled water until the washings were almost neutral and then with an organic solvent (e.g., methanol) to displace water. The catalyst, slightly moist with the organic solvent, was used as such.

EXAMPLE 9

*Methyl 3$\alpha$-acetoxy-11$\beta$-hydroxy-cholanate by hydrogenolysis of iodohydrin in pressure of Raney nickel at elevated pressure*

(a) A solution of 5.39 g. of crystallized methyl 3$\alpha$-acetoxy-11$\beta$-hydroxy-12$\alpha$-iodo-cholanate (from Example 5) in 108 ml. of distilled benzene and 144 ml. of distilled methanol was mixed with 54 g. of Raney nickel in an autoclave fitted with a mechanical stirrer. The autoclave was closed and the air was displaced by repeated flushing with hydrogen. The pressure was then increased to 50 p.s.i. (about 3½ atmospheres) and the mixture was stirred for 6 hours during which time the temperature gradually rose from 27° C. to 32° C. A sample taken after 3 hours of agitation showed the presence of about 20% of the starting iodohydrin while another sample at the end of 6 hours showed complete absence of the starting iodohydrin. The mixture was filtered through asbestos fiber and the residue was washed with benzene. The combined filtrate and washings were concentrated in vacuo to about 250 ml., washed with water twice, dried over Na$_2$SO$_4$ and evaporated to dryness in vacuo to leave 4.18 g. (99%) of a colorless solid having a melting point 144–148° C. This product was substantially pure methyl 3$\alpha$-acetoxy-11$\beta$-hydroxy-cholanate. (This compound is described by Lardon and Reichstein, Helv. Chim. Acta, 26, 586 (1943), and Wintersteiner and Moore, J. Biol. Chem., 162, 732 (1946). They give a melting point of 146–8° C. for the pure methyl 3$\alpha$-acetoxy-11$\beta$-hydroxy-cholanate.)

(b) To a solution of 10 g. of crude (uncrystallized) methyl 3$\alpha$-acetoxy-11$\beta$-hydroxy-12$\alpha$-iodo-cholanate in 200 ml. of distilled benzene and 260 ml. of distilled methanol, 1.57 g. of fused anhydrous sodium acetate and 19.5 g. of Raney nickel were added and the mixture hydrogenated in the autoclave as before for 2 hrs. at 100 p.s.i. during which time the temperature gradually rose from 24° C. to 32° C. Isolation of the product as in (a) above gave methyl 3$\alpha$-acetoxy-11$\beta$-hydroxy-cholanate as a pale yellow solid (7.94 g.), M.P. 141–146° C.

A portion (0.628 g.) of the preceding solid was crystallized by dissolution in 25 ml. ether, concentration of the solution on the steam-bath, dilution with hexane and further concentration until crystallization commenced. After refrigeration overnight, the crystals were filtered off, washed with cold hexane and dried at 54°/10 mm. to give 0.565 g. (90%) of pure methyl 3$\alpha$-acetoxy-11$\beta$-hydroxy-cholanate, M.P. 146–149° C., $[\alpha]_D^{24}$+56.54° (C.=1.0; CHCl$_3$). This represents an overall yield of 91.5% based on starting uncrystallized iodohydrin.

Another portion (0.702 g.) was crystallized from methanol under refrigeration overnight to give 0.625 g. (89%) of pure methyl 3$\alpha$-acetoxy-11$\beta$-hydroxy-cholanate, M.P. 148–150° C., $[\alpha]_D^{24}$+57.35° (C.=1.0; CHCl$_3$). This represents an overall yield of 90.6% based on starting uncrystallized iodohydrin.

(c) Using crystallized iodohydrin in procedure (b) above, a quantitative yield of pure methyl 3$\alpha$-acetoxy-11$\beta$-hydroxy-cholanate, M.P. 147–149° C. was obtained. Crystallization from methanol in 92% yield, raised the M.P. to 148–150° C.

Procedure (b) of this example used sodium acetate for removal of HI, as produced, and therefore, required less Raney nickel than in procedure (a).

EXAMPLE 10

*Methyl 3$\alpha$-acetoxy-11$\beta$-hydroxy-cholanate by hydrogenolysis of iodohydrin in presence of Raney nickel at atmospheric pressure*

A mixture of 76 mg. of crystallized methyl 3$\alpha$-acetoxy-11$\beta$-hydroxy-12$\alpha$-iodo-cholanate (prepared as in Example 5) and 0.7 g. of Raney nickel in 1.5 ml. of distilled benzene and 2 ml. of distilled methanol was stirred magnetically in a hydrogen atmosphere at room temperature and at atmospheric pressure for 17 hours. The mixture was filtered through asbestos fiber and the residue washed with ether. Evaporation of the combined filtrate and washing in vacuo at 50° C. (bath temp.) left 0.61 g. of a solid. This was dissolved in benzene, the benzene solution was washed twice with water, dried over Na$_2$SO$_4$ and evaporated in vacuo to leave crude methyl 3$\alpha$-acetoxy-11$\beta$-hydroxy-cholanate as a colorless solid (57 mg.; 92%). A 42 mg. portion was crystallized from hexane at −10° C. to give 26 mg. of colorless crystals, melting point 148–150° C. TLC showed this product to be substantially pure methyl 3α-acetoxy-11β-hydroxy-cholanate.

In a similar manner the procedures of the foregoing examples may be applied to other Δ$^{11}$-steroid compounds to provide the corresponding 11β-hydroxy-12α-iodo compounds and deiodinated 11β-hydroxy and 11-keto derivatives.

We claim:

1. A process for the preparation of a 11β-hydroxy-12α-iodo - cyclopentanopolyhydrophenanthrene compound, comprising reacting the corresponding Δ$^{11}$-cyclopentanopolyhydrophenanthrene compound with hypoiodous acid to cause HOI to add across the Δ$^{11}$-double bond.

2. A process for the preparation of a 11β-hydroxy-12α-iodo - cyclopentanopolyhydrophenanthrene compound, comprising reacting the corresponding Δ$^{11}$-cyclopentanopolyhydrophenanthrene compound with hypoiodous acid generated in situ in an aqueous organic solvent medium to cause HOI to add across the Δ$^{11}$-double bond.

3. The process of claim 2 wherein the hypoiodous acid is generated from N-iodosuccinimide in the aqueous organic solvent medium containing the said Δ$^{11}$-cyclopentanopolyhydrophenanthrene compound.

4. The process of claim 2 wherein the hypoiodous acid is generated from mercuric oxide and iodine in the aqueous organic solvent medium containing the said Δ$^{11}$-cyclopentanopolyhydrophenanthrene compound.

5. The process of claim 2 wherein the organic solvent of the aqueous organic solvent medium is selected from the group consisting of tertiary butanol and dioxane.

6. A process for the preparation of a 11β-hydroxy-12α-iodo-steroid compound of the bile acid series, comprising reacting the corresponding Δ$^{11}$-steroid compound of said series with hypoiodous acid in the presence of HClO$_4$ in an aqueous organic solvent medium.

7. A process for the preparation of methyl 3α-acetoxy-11β - hydroxy-12α - iodo - cholanate comprising reacting methyl 3α-acetoxy-Δ$^{11}$-cholenate with hypoiodous acid in an aqueous organic solvent medium in the presence of HClO$_4$ to cause HOI to add across the Δ$^{11}$-double bond.

8. A process for the preparation of an 11-oxygenated cyclopentanopolyhydrophenanthrene compound in greater than 50% yield from the corresponding Δ$^{11}$-cyclopentanopolyhydrophenanthrene comprising reacting said Δ$^{11}$-cyclopentanopolyhydrophenanthrene with hypoiodous acid in an aqueous solvent medium to provide the corresponding 11β-hydroxy-12α - iodo-cyclopentanopolyhydrophenanthrene compound, and reducing said 11β-hydroxy-12α-iodo-cyclopentanopolyhydrophenanthrene compound by catalytic hydrogenolysis to replace the 12α-iodo-substituent with hydrogen.

9. The process of claim 8 wherein the 11β-hydroxy-12α-iodo-steroid compound is oxidized to the corresponding 11-keto-12α-iodo-steroid compound and the 12α-iodo-substituent is replaced by hydrogen by treatment of the 11-keto-12-iodo-steroid with Zn-AcOH.

10. The process of claim 8 wherein the 12α-iodo-substituent is replaced by treatment of the 11β-hydroxy-12α-iodo compound with hydrogen in the presence of a hydrogenation catalyst.

11. The process of claim 8 wherein the 12α-iodo-substituent is replaced by hydrogenolysis of the 11β-hydroxy-12α-iodo compound in the presence of a Raney nickel catalyst.

12. The process of claim 11 wherein the Raney nickel catalyst is pretreated to ensure non-alkalinity just prior to use in the hydrogenolysis reaction.

13. The process of claim 11 wherein the hydrogenolysis is carried out in the presence of an alkali metal salt of a lower alkanoic acid which reacts with hydroiodic acid so as to remove hydroiodic acid from the sphere of the reaction.

14. The process of claim 11 wherein the hydrogenolysis is conducted under pressure of about 2–7 atmospheres.

15. The process of claim 11 wherein the hydrogenolysis is conducted in an anhydrous solvent mixture comprising benzene and methanol.

16. A process for replacing the 12α-iodo-substituent of a 11β - hydroxy-12α - iodocyclopentanopolyhydrophenanthrene with hydrogen comprising treating said 11β-hydroxy-12α-iodo-cyclopentanopolyhydrophenanthrene in an anhydrous solvent medium with hydrogen in the presence of non-alkaline Raney nickel catalyst and in the presence of an alkali metal salt of a lower alkanoic acid to remove HI from the sphere of the reaction as it is generated.

17. A process for the preparation of a 11β-hydroxy-12α-iodo-cyclopentanopolyhydrophenanthrene compound comprising reacting the corresponding Δ$^{11}$-cyclopentanopolyhydrophenanthrene compound with hypoiodous acid in an aqueous organic solvent selected from the group consisting of tertiary butanol and dioxane, in the presence of HClO$_4$, to cause HOI to add across the Δ$^{11}$-double bond, concentrating the resulting solution by distillation in vacuo to remove a major portion of the organic solvent, and precipitating the 11β-hydroxy-12α-iodo-cyclopentanopolyhydrophenanthrene compound by combining the concentrated solution with water.

18. A process for the preparation of a 11β-hydroxy-12α-iodo-cyclopentanopolyhydrophenanthrene compound, comprising reacting the corresponding Δ$^{11}$-cyclopentanopolyhydrophenanthrene compound with hypoiodous acid generated in situ from mercuric oxide and iodine in an aqueous organic solvent selected from the group consisting of tertiary butanol and dioxane, in the presence of HClO$_4$, to cause HOI to add across the Δ$^{11}$-double bond, concentrating the resulting solution by distillation in vacuo to remove a major portion of the organic solvent, precipitating the 11β-hydroxy-12α-iodo-steroid compound by combining the concentrated solution with water, treating the precipitated compound with aqueous KI solution to remove mercuric impurities, and crystallizing the treated 11β-hydroxy-12α-iodo-cyclopentanopolyhydrophenanthrene product from an organic solvent.

19. A process for the preparation of substantially pure methyl 3α-acetoxy-11β-hydroxy-12α-iodo-cholanate in high yield from methyl 3α-acetoxy-Δ$^{11}$-cholenate comprising adding HClO$_4$ and N-iodosuccinimide to an aqueous dioxane solution of said Δ$^{11}$-streoid to thereby generate hypoiodous acid and cause HOI to add across the Δ$^{11}$-double bond, isolating the resulting iodohydrin by precipitation into water, and crystallizing the isolated compound from an aqueous organic solvent mixture.

20. A process for the preparation of methyl 3α-acetoxy-11β-hydroxy-cholanate from methyl 3α-acetoxy-Δ$^{11}$-cholenate comprising adding HClO$_4$ and N-iodosuccinimide to an aqueous dioxane solution of said Δ$^{11}$-steroid to thereby generate hypoiodous acid and cause HOI to add across the Δ$^{11}$-double bond, isolating the resulting iodohydrin, and subjecting said iodohydrin to hydrogenolysis in the presence of a Raney nickel catalyst under superatmospheric pressure to substantially completely replace the nuclear iodine with hydrogen.

21. A process for the preparation of 11β-hydroxy-12α-iodo-pregnane-3:20-dione from Δ$^{11}$-pregnene-3:20-dione comprising adding HClO$_4$ and N-iodosuccinimide to an aqueous dioxane solution of said Δ$^{11}$-steroid to thereby generate hypoiodous acid and cause HOI to add across the Δ$^{11}$-double bond, isolating the resulting iodohydrin by precipitation with water, and crystallizing the isolated compound from an organic solvent.

22. A process for the preparation of an 11-oxygenated cyclopentanopolyhydrophenanthrene compound in greater than 50% yield from the corresponding Δ$^{11}$-cyclopentanopolyhydrophenanthrene compound comprising reacting said Δ$^{11}$-cyclopentanopolyhydrophenanthrene compound with hypoiodous acid in an aqueous organic solvent medium to provide the corresponding 11β-hydroxy-12α-iodo-cyclopentanopolyhydrophenanthrene compound, oxidizing said 11β-hydroxy-12α-iodo-cyclopentanopolyhydrophenanthrene compound to the corresponding 11-keto-12α-iodo-cyclopentanopolyhydrophenanthrene compound, and treating the said 11-keto-12α-iodo-cyclopentanopolyhydrophenanthrene compound with Zn-AcOH to replace the 12α-iodo substituent with hydrogen.

23. The process of claim 16 wherein the alkali metal salt of a lower alkanoic acid is sodium acetate.

References Cited by the Examiner

UNITED STATES PATENTS

| | | | |
|---|---|---|---|
| 2,403,683 | 7/1946 | Reichstein | 260—397.1 |
| 2,791,593 | 5/1957 | Djerassi | 260—397.47 |
| 2,986,560 | 5/1961 | Wettstein et al. | 260—239.55 |

LEWIS GOTTS, *Primary Examiner.*